United States Patent

Deigner

[11] Patent Number: 5,848,676
[45] Date of Patent: Dec. 15, 1998

[54] SHOCK ABSORBING STRUT WITH AN ALUMINUM CONTAINER FOR A MOTOR VEHICLE

[75] Inventor: Bruno Deigner, Schweinfurt, Germany

[73] Assignee: Fichtel & Sachs AG, Schweinfurt, Germany

[21] Appl. No.: 639,221

[22] Filed: Apr. 26, 1996

[30] Foreign Application Priority Data

Apr. 28, 1995 [DE] Germany .................. 195 15 643.9

[51] Int. Cl.⁶ .................................. F16F 9/18; F16F 9/36
[52] U.S. Cl. .................................. 188/321.11; 188/322.17; 188/322.19
[58] Field of Search ................. 188/321.11, 322.11, 188/322.12, 322.19; 280/668, 688, 690, 691

[56] References Cited

U.S. PATENT DOCUMENTS

| | | |
|---|---|---|
| 2,576,658 | 11/1951 | Werner . |
| 2,624,592 | 1/1953 | MacPherson . |
| 2,653,683 | 9/1953 | Strauss . |
| 2,732,039 | 1/1956 | Funkhouser et al. . |
| 4,531,618 | 7/1985 | Kobiske et al. . |
| 5,441,132 | 8/1995 | Pradel et al. ............... 188/322.17 |

FOREIGN PATENT DOCUMENTS

| | | |
|---|---|---|
| 0653578 | 5/1995 | European Pat. Off. . |
| 2695446 | 3/1994 | France . |
| 1912292 | 1/1965 | Germany . |
| 2656707 | 6/1978 | Germany . |
| 8227474 | 1/1983 | Germany . |
| 8510058 | 8/1985 | Germany . |
| 4011423 | 10/1990 | Germany . |
| 4201837 | 2/1993 | Germany . |
| 4129645 | 3/1993 | Germany . |
| 4230238 | 3/1994 | Germany . |
| 9315574 | 3/1994 | Germany . |
| 4331976 | 3/1995 | Germany . |
| 9420430 | 4/1995 | Germany . |
| 1141247 | 6/1989 | Japan . |
| 1491251 | 11/1977 | United Kingdom . |
| 2187532 | 9/1987 | United Kingdom . |
| 2297819 | 8/1996 | United Kingdom . |

OTHER PUBLICATIONS

"Fahrwerktechnik: Stoss– und Schwingungsdämpfer", Vogel Buchverlag Würzburg, 1989, pp. 144, 152, 153, 155; Reimpell, et al.

"Beschreibung der Axial–Kompensatoren", 1971, Hydra, pp. 40, 41, 62, 63.

*Primary Examiner*—Robert J. Oberleitner
*Assistant Examiner*—Chris Schwartz
*Attorney, Agent, or Firm*—Nils H. Ljungman and Associates

[57] ABSTRACT

A vibration damper for a motor vehicle is taught, which vibration damper has a cylinder tube in which a piston rod which is centered by a piston rod guide can move axially. A container tube encloses the cylinder tube, and the container tube is made of a material which has a significantly higher coefficient of thermal expansion than the material of the cylinder tube. Aluminum is an example if the container tube material. A compensation device compensates for the length difference between the cylinder tube and the container tube at temperatures below and above the temperature at which the vibration damper is manufactured. The container tube is characterized by the fact that preferably at least two expansion beads are formed in the wall of the container tube. The expansion beads compensate for thermal changes in length of the container tube and hold the cylinder tube under a bias with respect to the container tube over the entire range of operating temperatures.

13 Claims, 3 Drawing Sheets

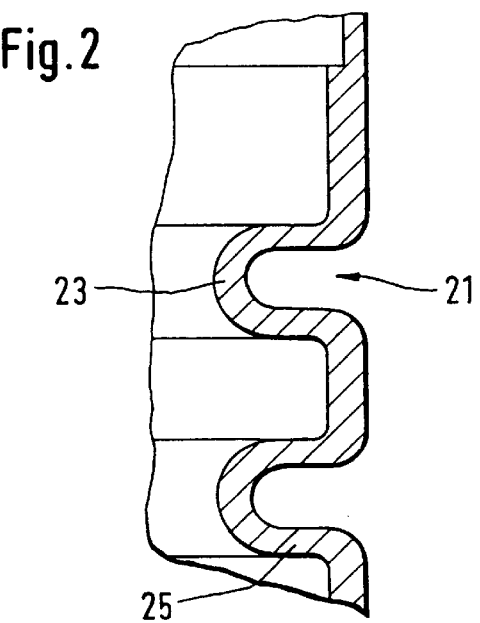
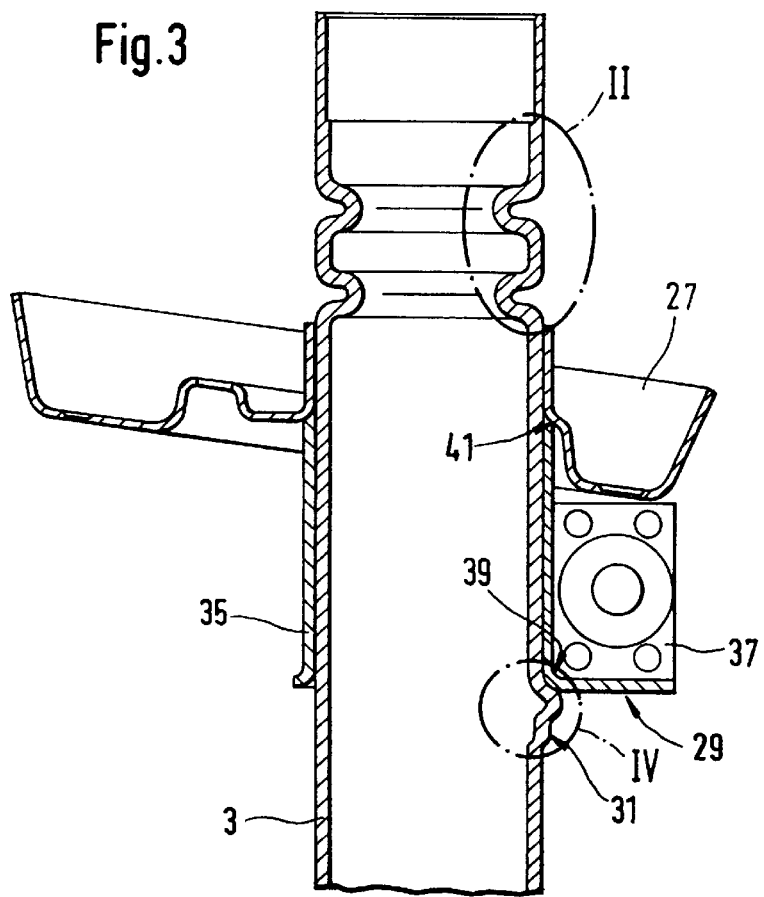
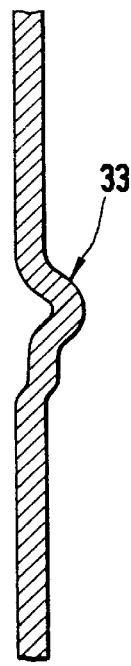

SHOCK ABSORBING STRUT WITH AN ALUMINUM CONTAINER FOR A MOTOR VEHICLE

BACKGROUND OF THE INVENTION

1. Field of the Invention

This invention generally relates to a vibration damper or shock absorber for a motor vehicle. The vibration damper has a cylinder tube in which a piston rod which is centered by a piston rod guide can move axially. A container tube encloses the cylinder tube and is made of a material which has a significantly higher coefficient of thermal expansion than the material of the cylinder tube. The vibration damper has a compensation device to compensate for the length difference between the cylinder tube and the container tube, which length difference occurs at temperatures below and above the temperature at which the vibration damper is manufactured.

2. Background Information:

A similar known vibration damper is described, for example, in German Patent No. 42 30 238. On this two-tube vibration damper, the container tube, in contrast to the cylinder tube, is made of aluminum. To compensate for the stresses which naturally occur as a result of the different coefficients of thermal expansion of the two bodies, compensation means are provided in the form of an elastic body, e.g. a plate spring in combination with an encircling bead. One disadvantage of this type of compensation for the different amounts of longitudinal expansion is the requirement for the use of the plate spring, since a single plate spring is hardly capable of applying the necessary bias. Consequently, a plurality of plate springs must be used, which increases the cost of manufacturing the vibration damper. The limited amount of radial space available also reduces flexibility in the design of the plate springs.

An additional problem on vibration dampers with a container tube made of aluminum consists of the fastening of a holder of any desired state, e.g. for a stabilizer or axle guide. It is common knowledge that welding aluminum is a relatively complex, time-consuming and expensive process. Consequently, one question that must be answered is how to fasten the accessories to the container tube. German Utility Model No. 85 10 058 discloses that support means in the form of partial beads can provide support for a spring plate. But that does not solve the problem of how to fasten a holder of the desired shape without requiring a welded connection.

OBJECT OF THE INVENTION

The object of the invention described below is to provide a thermal expansion compensation device for a vibration damper that is economical and simplifies production and provide a holder for a vibration damper which holder does not need a welded support.

SUMMARY OF THE INVENTION

The present invention teaches that this object can be accomplished if the container tube has, as compensation means, at least two expansion beads which hold the cylinder tube under a bias with respect to the container tube, over the entire range of operating temperatures. The omission of the plate springs solves the design and cost problems mentioned above. The assembly and installation processes also become easier. The beads in the container tube can be adapted individually, so that the situation is very flexible with regard to the bias which is required between the cylinder tube and the container tube.

The present invention also teaches that the container tube advantageously has a spring plate for a vehicle suspension spring, and the expansion beads are preferably located between the spring plate and the piston rod exit side end of the container tube. On a vibration damper realized in the form of a shock absorbing strut, the greatest load is typically exerted in the vicinity of the bottom of the container tube. As a result of the location of the expansion beads above the spring plate, two advantages are achieved. On one hand, the axial displacement of the position of the spring plate is optimized, since the change in the length of the container tube occurs in an area which has practically no effect on the spring plate. In addition, only small loads typically occur in the container tube between the spring plate and the piston rod exit, which is the portion of the cylinder tube where the expansion beads are formed.

The expansion beads thereby preferably have an essentially U-shaped contour, which consists of a bending radius and webs which can each taper into the nominal diameter of the container tube. This particular type of configuration of the beads makes possible a reliable elastic expansion of the container tube and has the added feature of high strength in the transverse direction.

On a vibration damper which comprises a cylinder tube in which a piston rod centered by a piston rod guide can move axially, a container tube which encloses the cylinder tube, and support means for a spring plate, there can be a holder, which can be of any desired shape on the container tube for an additional accessory, which holder can be supported on the support means and supports the spring plate on its end surface farther from the support means. The support means make it possible to fasten the holder without requiring a relatively complex, time-consuming and expensive weld seam between the holder and the container tube. This type of mounting can also represent a cost advantage, which means that the use of this mounting for a holder can be considered to be very generally advantageous, essentially regardless of the material of which the container tube is made.

In accordance with one embodiment of the invention, the end surface of the holder is realized in a conical shape. That produces an increased radial bias of the holder on account of the forces introduced by the vehicle suspension spring by means of the spring plate, so that the position of the holder is essentially guaranteed under all operating conditions. The holder can also have a cylindrical segment which, together with the container tube, forms an interference fit.

To compensate for the transverse forces, spring plates on vibration dampers are very frequently oriented at an angle on the container tube. The part of the spring plate which is centered on the container tube is generally in a plane which is perpendicular to the longitudinal axis of the damper. For the spring plate, that results in a greater contact area with the holder. So that the spring plate can also be oriented at an angle to the container tube, the holder can have a bracket which runs radially, and the dimension of which in the axial direction of the vibration damper is shorter than the cylinder segment.

One feature of the invention resides broadly in a vibration damper for a motor vehicle, the vibration damper comprising: element for connecting to a first portion of a motor vehicle; element for connecting to a second portion of a motor vehicle; cylinder element; the cylinder element having a length; the cylinder element being constructed of a first material; the first material having a coefficient of thermal expansion; piston element, the piston element being slidably mounted inside the cylinder element; the piston element dividing the cylinder element into two working chambers; piston rod element being connected to the piston to move with the piston; an outer tube surrounding the cylinder element; the outer tube comprising a substantially cylindrical outer tube wall; the outer tube having a longitudinal axis; the outer tube having a cross-section substantially transverse to the longitudinal axis; the outer tube being constructed of a second material; the second material having a coefficient of thermal expansion; the coefficient of thermal expansion of the second material being substantially different than the coefficient of thermal expansion of the first material; element for compensating for a change in the length of the cylinder element and a change in length of the outer tube element upon variation in temperature; the element for compensating comprising at least one deformation of the cylindrical outer tube wall; the deformation having a cross-section substantially transverse to the longitudinal axis; and the cross-section of the deformation being generally different than the cross-section of the outer tube.

Another feature of the invention resides broadly in a vibration damper for a motor vehicle, the vibration damper comprising: element for connecting to a first portion of a motor vehicle; element for connecting to a second portion of a motor vehicle; cylinder element; the cylinder element having a length; piston element, the piston element being slidably mounted inside the cylinder element; the piston element dividing the cylinder element into two working chambers; piston rod element being connected to the piston to move with the piston; an outer tube surrounding the cylinder element; the outer tube having a length; a suspension spring support plate; first support element; the first support element comprising element for supporting the suspension spring support plate; the first support element being disposed on the outer tube; the outer tube comprising second support element; and the second support element comprising element for supporting the first support element on the outer tube.

The above discussed embodiments of the present invention will be described further hereinbelow with reference to the accompanying figures.

BRIEF DESCRIPTION OF THE DRAWINGS

The invention is explained in greater detail below with reference to the embodiments which are illustrated in the accompanying drawings.

FIG. 2 illustrates the expansion beads of the outer tube,

FIG. 3 illustrates the holder mounted on the outer tube,

FIG. 4 illustrates the support means of the outer tube, and

DESCRIPTION OF THE PREFERRED EMBODIMENT

Figure 1:
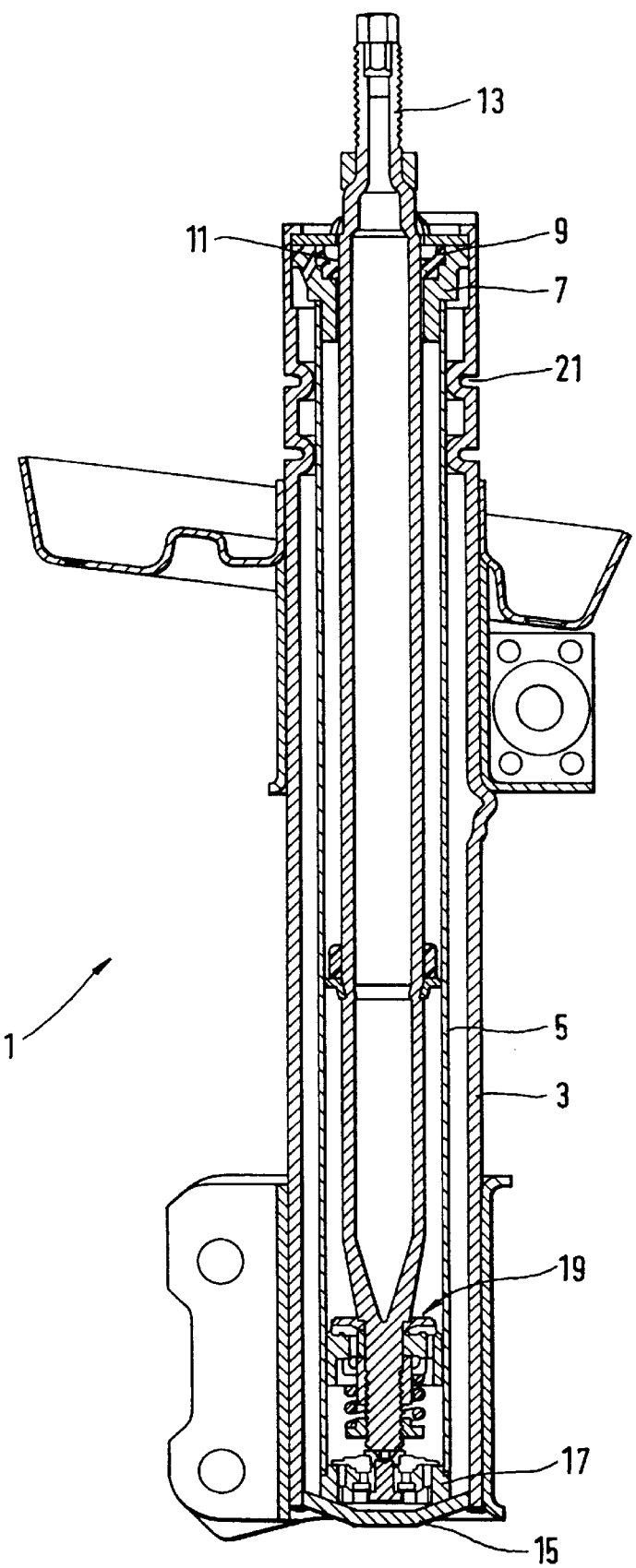
FIG. 1 is an overall view of a vibration damper.

FIG. 1 illustrates an embodiment of a vibration damper 1 which is realized in the form of a shock absorbing strut. The vibration damper 1 comprises a container tube or outer tube 3 which in this specific embodiment is made of aluminum, to keep the weight of the vibration damper low. Inside the vibration tube or container tube 3 there is a cylinder tube 5 which is centered by means of a piston rod guide 7 with respect to the container tube 3. The piston rod guide 7 with its gaskets 9, 11 closes the vibration damper 1 on the end from which an axially movable piston rod 13 extends. The container tube 3 is thereby at least partly reshaped so that it is in contact on the upper side of the piston rod guide 7. The other end of the vibration damper 1 is closed by a base 15. Supported on this bottom is a base valve 17 which in turn acts as a bearing or support for the cylinder tube 5. There is a bias chain created among the components of the base 15, the base valve 17, the piston rod guide 7 and the reshaped container tube 3.

To elaborate, during assembly preferably the top end of the container tube 3 is deformed, for example by rolling, so that the piston rod guide 7 is held in position. The bias chain refers to the fact that the cylinder tube 5 is held in axial compression between the base valve 17 and the piston rod guide 7, which in turn holds the container tube 3 in axial tension. Thus, the bias chain is made up of the cylinder tube 5 pushing on the base valve 17, which base valve 17 pushes on the base 15, which base 15 exerts a force at the bottom of container tube 3 which force holds container tube 3 under tension, which container tube 3 at the top portion of container tube 3 holds piston rod guide 7 securely, which piston rod guide 7 is held between container tube 3 and cylinder tube 5. The bias is needed to allow for thermal dimension changes. In summary, the tension of the outer tube 3 holds cylinder tube 5 in compression, or taking the opposite perspective, the compression of cylinder tube 5 holds the outer tube 3 in tension; the difference is only a matter of perspective, each description describes the same biasing properties.

During the assembly, the base valve 17 can be inserted in the container tube 3, which container tube 3 is provided with the base 15. Then the piston rod 13, with the piston 19, is introduced into the cylinder tube 5 which, for strength reasons, is generally made of steel. In a further step of the process, the piston rod guide 7 provided with the gaskets 9, 11 is installed. With the vibration damper 1 still open, the cylinder tube 5 is elastically shortened by means of the piston rod guide 7 by means of a jig. That is, the cylinder tube 5 is shortened by a compression force from the jig. The length by which the cylinder tube 5 is shortened corresponds to the difference in the lengths of expansion of the cylinder tube 5 and the container tube 3 which can be caused by the operating temperature. Finally, the container tube 3 is reshaped on the open end to hold piston rod guide 7 securely, whereby the bias chain described above is closed. A bias is thereby created, starting from the cylinder tube 5 to the container tube 3, which is compensated as a function of the instantaneous temperature by at least two encircling expansion beads 21 which have been machined into the container tube 3. The expansion beads 21, starting from the installation temperature of 20 degrees C., for example, are then pulled back together if a temperature above this limit temperature occurs, since the container tube 3 expands more than the cylinder tube 5 and thus the bias which is absorbed by the expansion beads 21 is reduced to an allowable extent. In the reverse case, for example when the vehicle cools down at winter temperatures, the expansion beads 21 expand, to compensate for the increasing bias between the cylinder tube 5 and the container tube 3, which container tube 3 shrinks to a greater extent than cylinder tube 5.

Alternatively, but with an identical effect, the manufacturing process can also be modified by fabricating the vibration damper 1 with a slight bias, and then molding the expansion beads 21 into the container tube 3.

Figure 5:
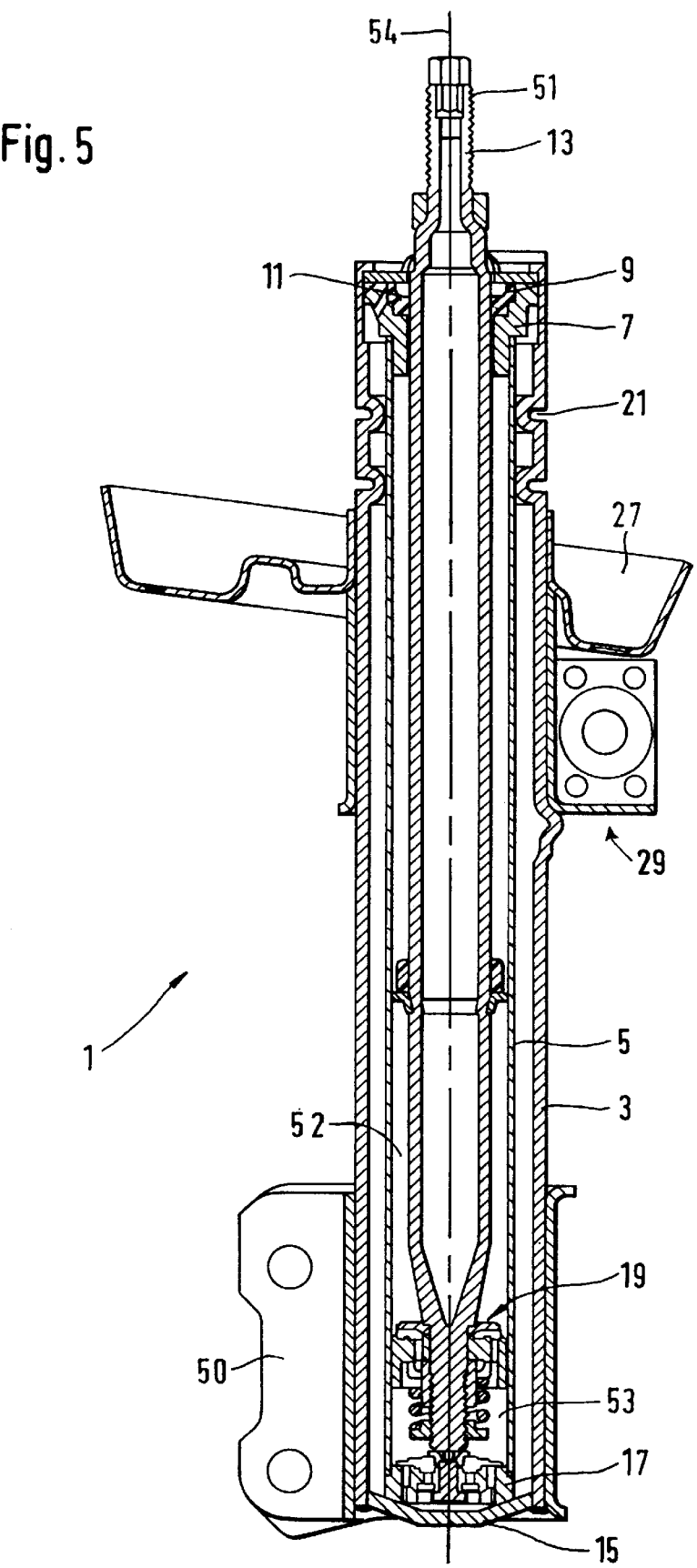
FIG. 5 is similar to FIG. 1 but shows more details.

FIG. 5 shows the vibration damper 1 with a mount 50 for attachment to a addition,n portion of a motor vehicle. In addition, connecting rod 13 has threaded end portion 51 for mounting on a body of a motor vehicle. The piston 19 divides the cylinder tube 5 into two working chambers 52, 53. The container tube 3 is essentially a cylinder having a wall, and the cylinder has a circumference. The container tube 3 has a length along a central longitudinal axis 54. Most of the components of the vibration damper 1 have the same central longitudinal axis 54, so the central longitudinal axis 54 is the central longitudinal axis for piston rod 13, piston 19, and cylinder tube 5 among other components. The cross-section of the container tube 3 transverse to the central longitudinal axis is essentially circular.

FIG. 2 shows a more detailed view of one embodiment of the expansion beads 21. The expansion beads 21 can have an essentially U-shaped contour which consists of a bending radius 23 and webs 25 which taper into the nominal diameter. The length of the webs 25 has a dominant influence on the "spring action" of the expansion beads 21. Simple bends rolled into the container tube 3 can be too rigid with regard to expansion when the wall thickness of the container tube 3 is relatively high.

To elaborate further on the shape of expansion beads 21, the bending radius 23 preferably has a substantially semicircular shape, and the webs 25 extend along tangents from the ends of the semicircle or bending radius 23 towards the wall of outer tube 3. The webs 23 can be described as having a taper since the machining process can create a taper in the thickness of the webs 23, or alternatively, when the outer tube 3 is in tension the webs may tend to diverge slightly from one another as the webs 25 extend from the bending radius 23 to the wall of the outer tube 3. The webs 25 extend from the bending radius 23 to the inner diameter of outer tube 3, so that the semicircular portion of the beads 21 lie closer to the central longitudinal axis 54 (see FIG. 5) than the cylindrical wall portion of container tube 3. Although the beads 21 are described here as having different sections, bending radius 23 and webs 25, the beads 21 are preferably machined from the wall of outer tube 3, so the outer tube 3 and the beads 21 are one continuous piece of material.

The expansion beads 21 can be part of the container tube 3, but a cross-section through one of the expansion beads 21 is different than the cross-section of other portions of the the container tube 3.

The expansion beads 21 are preferably on the portion of the outer tube 3 between the spring plate 27 and the end of the outer tube 3 from which the piston rod 13 exits. Therefore, the expansion beads 21 are not under a large load, unlike the large load supported by the portion of the outer tube 3 beneath the spring plate 27.

FIG. 3 is limited to an illustration of the connection of a spring plate 27 and a holder 29 of a desired shape, e.g. a holder 29 for a stabilizer, on the container tube 3. The container tube 3 can have a plurality of impressed support means in the form of buttons or projections 31. The buttons 31 can be dispersed around the circumference of container tube 3. The holder 29 is in contact with the end surfaces 33 (FIG. 4) of the support means. The holder 29 itself can consist of a cylinder segment 35 and a bracket 37 which bracket 37 extends essentially radially, whereby the axial length of the cylinder segment 35 is greater than the axial length of the bracket 37. A transition 39, in the form of a bending radius from the cylinder segment 35 to the bracket 37, and the end surface 33 are optimized with regard to the surface pressure which occurs. In practical terms, the end surface 33 represents a negative of the transition 39, so that there is a very large contact surface between the transition 39 of the holder 29 and the end surface 33. For example, the convexity of transition 39 is dimensioned to fit into the concavity of end surface 33; that is, stated more generally, the space adjacent transition 39 is filled by the shape of end surface 33.

To elaborate further on the bracket 37, in one embodiment, the bracket 37 extends radially outward from the cylinder segment 35 of holder 29. The bracket 37 can be realized in the form of a bent section of a one piece holder 29. Alternatively, at least a portion of the bracket 37 can be welded to the holder 29.

The other end surface 41 of the cylinder segment 35 is realized in the shape of a cone for the spring plate 27, to once again provide the largest possible contact surface for the spring plate 27. In spite of the inclined position of the spring plate 27, made possible by the corresponding longitudinal dimensions of the bracket 37 and of the cylinder segment 35, which create a clearance or free space for the spring plate 27, the end surface 41 lies in a plane which is essentially at right angles to the longitudinal axis of the damper, so that there are no problems with the orientation of the spring plate.

That is, the upper end 41 of cylinder segment 35 can be in the shape of a cone, as shown in FIG. 3. The cone shape begins at the outer circumference of the cylinder segment 35 and tapers towards the inner circumference of the cylinder segment 35 as the taper extends in the axial direction towards the spring plate 27. The cone shape of the end surface 41 provides a larger contact area with the spring plate 27. In addition, the length of bracket 37 is dimensioned smaller than the length of cylinder segment 35 in the longitudinal direction of the outer tube 3, thereby accommodating the spring plate 27 which spring plate 27 has an inclined position with respect to the container tube 3, but the support surface 41 is essentially orthogonal to the outer tube 3. The support surface 41 is said to be essentially orthogonal to the outer tube 3, in that, a plane, in which the tip of the conical support surface 41 lies, is essentially orthogonal to the longitudinal axis of the outer tube 3. However, the contour of conical support surface 41 itself forms an angle with the orthogonal plane. Practically, the conical shape of the support surface 41 provides a larger contact area for supporting the spring plate 27, while at the same time supporting the contact surface of the spring plate 27 in a plane which is orthogonal to the outer tube 3.

As an additional side effect, the spring plate 27, when installed inside a vehicle axle, on account of the spring force of a vehicle suspension spring (not shown), can exert a radial force component directed inward on the holder 29. Consequently, the holder 29 is acted upon by the two radial force components on the end surface 41 and the transition 39, which produces a friction force which is in the opposite direction to a force which is applied in the peripheral direction, of the vibration damper on the holder 29. In addition, the cylinder segment 35 and the container tube 3 form an interference fit which represents an additional friction force which counteracts the force components which are applied in the peripheral direction. The entire series arrangement of the holder 29 and of the spring plate 27 can be held by the spring force of the vehicle suspension spring and the support means, and does not require a weld seam. Of course, this type of holder fastening can also be used on container tubes which are made of an easily weldable material.

That is, when a spring is installed on the vibration damper or strut 1, the force of the spring forces the spring plate 27 securely against the holder 29. As a result of the cone shape of end surface 41 of the holder 29, a radial force results directed inwardly towards the center of the outer tube 3. The radial force creates a friction force between the spring plate 27 and the holder 29. In addition, the radial force can create a friction force between the portion of the cylinder segment 35 in the vicinity of the end surface 41 and the outer tube 3.

These friction forces act in the opposite direction to the force exerted on the vibration damper by an applied load, so that the holder 29 is held securely in place. In addition, when a spring is installed on the vibration damper 1, a radial force results between the transition 39 of the holder 29 and the end surfaces 33 of the support buttons 31, which radial force also creates a friction force similar to the friction force discussed above. Further, the inner surface of the holder 29, which inner surface contacts the outer surface of the outer tube 3 also can be dimensioned to form an interference fit therebetween, which again creates a friction force similar to the friction force discussed above. This arrangement of the holder 29 and spring plate 27 on the outer tube 3 can be held in position by the force of a vehicle suspension spring (not shown), so no welding is required. In addition, an interference fit between holder 29 and outer tube 3 can be created by forcing the properly dimensioned holder 29 over the outer tube 3; this interference fit can help hold the holder 29 on outer tube 3.

The support buttons 31 which project outwardly from the outer tube 3 can involve a deformation of the outer tube 3 to form projections and can be manufactured on the outer tube 3 by known machining processes such as stamping or possibly a modified rolling technique, modified since the support buttons 31 do not encircle the entire outer tube 3.

One feature of the invention resides broadly in the vibration damper, comprising a cylinder tube in which a piston rod which is centered by a piston rod guide can move axially, a container tube which encloses the cylinder tube and is made of a material which has a significantly higher coefficient of thermal expansion than the material of the cylinder tube, compensation means for the length difference between the cylinder tube and the container tube which occurs at temperatures below and above the installation temperature, characterized by the fact that the container tube 3, as compensation means, has at least two expansion beads 21 which hold the cylinder tube 5 under a bias with respect to the container tube over the entire range of operating temperatures.

Another feature of the invention resides broadly in the vibration damper characterized by the fact that the container tube has a spring plate 27 for a vehicle suspension spring, and the expansion beads 21 are located between the spring plate and the piston rod exit side end of the container tube.

Yet another feature of the invention resides broadly in the vibration damper characterized by the fact that the expansion bead 21 has an essentially U-shaped contour which consists of a bending radius 23 and webs 25 which taper into the nominal diameter of the container tube.

Still another feature of the invention resides broadly in the vibration damper, comprising a cylinder tube in which a piston rod centered by a piston rod guide is located so that it can move axially, a container tube which encloses the cylinder tube and has support means for a spring plate, characterized by the fact that on the container tube 3 there is a holder 29 of any desired type for an additional accessory which is supported on the support means 31 and supports the spring plate 27 on its end surface 41 farther from the support means.

A further feature of the invention resides broadly in the vibration damper characterized by the fact that the end surface 41 of the holder is realized in a conical shape.

Another feature of the invention resides broadly in the vibration damper characterized by the fact that the holder has a cylindrical segment 35 which, together with the container tube, forms an interference fit.

Yet another feature of the invention resides broadly in the vibration damper characterized by the fact that the holder 29 has a bracket 37 which runs radially, the dimension of which in the axial direction of the vibration damper is shorter than the cylindrical segment.

Examples of shock absorbers, vibration dampers, and struts having holders for accessories such as wires and lines can possibly be found in the following patent documents: U.S. Pat. No. 5,251,728 entitled "Hydraulic vibration damper or shock absorber with electrical control connections and connector therefore"; U.S. Pat. No. 4,708,554 entitled "Strut"; and U.S. patent application Ser. No. 08/263,773 filed on Jun. 23, 1994 entitled "Shock absorber, and shock absorber, such as a macpherson strut, with decompression stop limit bracket" having inventors Gunther Handke and Andreas Zietsch, which corresponds to Federal Republic of Germany patent application No. P 43 21 036.8, filed on Jun. 24, 1993, which corresponds to DE-OS 43 21 036.8 and DE-PS 43 21 036.8.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for a motor vehicle, said vibration damper comprising:

an arrangement for connecting to a first portion of a motor vehicle;

an arrangement for connecting to a second portion of a motor vehicle;

a cylinder;

said cylinder having a length;

a piston, said piston being slidably mounted inside said cylinder;

said piston dividing said cylinder into two working chambers;

a piston rod being connected to said piston to move with said piston;

an outer tube surrounding said cylinder;

said outer tube having a longitudinal axis;

said outer tube having a length and an axial direction along the longitudinal axis;

a suspension spring support plate for supporting a vehicle suspension spring;

a first axial support;

said suspension spring support plate and said first axial support being separate components such that said suspension spring support plate being removable from said outer tube without removing said first axial support from said outer tube;

said first axial support comprising an arrangement for supporting said suspension spring support plate in the axial direction;

said first axial support being disposed on said outer tube;

said outer tube comprising a second axial support;

said second axial support comprising an arrangement for supporting said first axial support on said outer tube in the axial direction; and said first axial support being configured to produce a friction force between said first support and said outer tube upon a vehicle suspension spring exerting a spring force on said suspension spring support plate.

2. The vibration damper of claim 1 wherein:

said first axial support comprises an arrangement for holding components of a motor vehicle.

3. The vibration damper of Claim 2, wherein:

said first axial support comprises a first end and a second end;

said first end of said first axial support is disposed adjacent to said suspension spring support plate;

said first end of said first axial support is disposed to support said suspension ring support plate;

said second end of said first axial support is disposed adjacent to said second axial support;

said second end of said first axial support is disposed to be supported by said second axial support; and said first axial support is configured to produce a friction force between said outer tube and a portion of said first axial support adjacent to said first end of said first axial support upon a vehicle suspension spring exerting a spring force on said suspension spring support plate.

4. The vibration damper of claim 3, wherein:

said first end comprises a conical shape configured to produce a friction force between said outer tube and said portion of said first axial support adjacent to said first end of said first axial support upon a vehicle suspension spring exerting a spring force on said suspension spring support plate.

5. The vibration damper of claim 4, wherein:

said first axial support comprises a cylindrical portion;

said cylindrical portion surrounds said outer tube; and said cylindrical portion forms an interference fit with said outer tube.

6. The vibration damper of claim 5, wherein:

said arrangement for holding components of a motor vehicle comprises a bracket portion for holding components of a motor vehicle; and said bracket portion extends radially outward from said cylindrical portion of said first axial support.

7. The vibration damper of claim 6, wherein:

said cylindrical portion has a longitudinal axis;

said cylindrical portion has a length in the direction of said longitudinal axis;

said bracket portion has a length in the direction of said longitudinal axis; and the length of said bracket portion is shorter than the length of said cylindrical portion.

8. The vibration damper of claim 7, wherein:

said outer tube comprises a substantially cylindrical outer tube wall;

said outer tube has a central longitudinal axis;

said second axial support comprises at least one deformation of said outer tube wall; and said at least one deformation of said outer tube wall is disposed to protrude from said substantially cylindrical outer tube wall in a direction away from the central longitudinal axis of said outer tube.

9. The vibration damper of claim 8, wherein:

said at least one deformation comprises at least one projection protruding from said outer tube wall;

said outer tube has a circumference; and said at least one projection comprises a plurality of projections disposed around the circumference of said outer tube.

10. The vibration damper according to claim 1, wherein said first axial support is force fitted friction fit, without play, onto said outer tube.

11. The vibration damper according to claim 10, wherein:

said outer has an outer surface disposed toward said first axial support;

said first axial support has an inner surface disposed toward said outer tube; and said first axial support is configured and disposed to provide substantially continuous frictional contact between said outer tube and said first axial support.

12. The vibration damper of claim 11, wherein:

said first axial support comprises a first end and a second end;

said first end of said first axial support is disposed adjacent to said suspension spring support plate;

said first end of said first axial support is disposed to support said suspension ring support plate;

said second end of said first axial support is disposed adjacent to said second axial support;

said second end of said first axial support is disposed is disposed to be supported by said second axial support; and said first axial support is configured to produce a friction force between said outer tube and a portion of said first axial support adjacent to said first end of said first axial support upon a vehicle suspension spring exerting a spring force on said suspension spring support plate.

13. A vibration damper for a motor vehicle, said vibration damper comprising:

an arrangement for connecting to a first portion of a motor vehicle;

an arrangement for connecting to a second portion of a motor vehicle;

a cylinder;

said cylinder having a length;

a piston, said piston being slidably mounted inside said cylinder;

said piston dividing said cylinder into two working chambers;

a piston rod being connected to said piston to move with said piston;

an outer tube surrounding said cylinder;

said outer tube having a longitudinal axis;

said outer tube having a length and an axial direction along the longitudinal axis;

a suspension spring support plate for supporting a vehicle suspension spring;

a first axial support;

said suspension spring support plate and said first axial support being separate components such that said suspension spring support plate being removable from said outer tube without removing said first axial support from said outer tube;

said first axial support comprising an arrangement for supporting said suspension spring support plate in the axial direction;

said first axial support being disposed on said outer tube;

said outer tube comprising a second axial support; and said second axial support comprising an arrangement for supporting said first axial support on said outer tube in the axial direction.

* * * * *

UNITED STATES PATENT AND TRADEMARK OFFICE
CERTIFICATE OF CORRECTION

PATENT NO.   : 5,848,676
DATED        : December 15, 1998
INVENTOR(S)  : Bruno DEIGNER It is certified that error appears in the above-identified patent and that said Letters Patent is hereby corrected as shown below:

On the Title Page, item [57], in the Abstract, line 7, after 'example', delete "if" and substitute therefor --of--.

In column 4, line 63, after 'to a', delete "addition,n" and substitute therefor --suspension--.

Signed and Sealed this

Twenty-sixth Day of October, 1999

*Attest:*

Q. TODD DICKINSON

*Attesting Officer*   Acting Commissioner of Patents and Trademarks